United States Patent Office 3,318,832
Patented May 9, 1967

3,318,832
PROCESS FOR PEPTISING SULPHUR MODIFIED CHLOROPRENE LATEX
Anthony Archibald Sparks, Epsom Downs, and Robert Charles Moore, Sutton, England, assignors to The Distillers Company Limited, Edinburgh, Scotland, a British company
No Drawing. Filed June 2, 1964, Ser. No. 372,118
14 Claims. (Cl. 260—29.7)

The present invention relates to an improved process for peptising sulphur modified polychloroprene latex and to the sulphur modified polychloroprene rubber isolated from the peptised latex.

By the term sulphur modified polychloroprene latex is meant throughout this specification any synthetic rubber latex formed by polymerising 2-chloro-1,3-butadiene, or 2-chloro-1,3-butadiene and a copolymerisable monomer or monomers in the presence of sulphur. By the term peptisation is meant throughout this specification the breakdown of the sulphur modified polychloroprene to give a more plastic product.

Many processes and agents for peptising sulphur modified polychloroprene latex are known, for example the processes and agents described in British patent specification 529,838.

It is an object of the present invention to provide an improved process for peptising sulphur modified polychloroprene latex.

According to the present invention the improved process for the peptisation of sulphur modified polychloroprene latex comprises peptising a sulphur modified polychloroprene latex in the presence of a water soluble inorganic compound having a thiosulphate, sulphide or dithionite radical or mixtures thereof.

The water soluble inorganic compounds having a thiosulphate, sulphide or dithionite radical most suitable for use in the present invention are the ammonium and alkali metal salts of these radicals. The preferred alkali metal salts are the sodium salts. Suitable proportions by weight of these compounds in relation to the weight of dry rubber in the latex are 5 percent or less and the preferred proportion is 1 percent or less.

Any peptising agents such as for example those described in British Patent 529,838 are suitable; particularly suitable peptising agents are a tetra alkyl thiuram disulphide, e.g. tetraethyl thiuram disulphide; tetraethyl thiuram disulphide and an inorganic alkaline material such as sodium hydroxide and/or sodium phosphate; and tetraethyl thiuram disulphide and a secondary amine such as diethylamine. Preferred peptising agents are mixtures of a tetra lower alkyl thiuram disulphide and a dialkyl dithiocarbamate.

By lower alkyl group is meant an alkyl group containing from 1 to 6 carbon atoms. The preferred tetra lower alkyl thiuram disulphide is tetra ethyl thiuram disulphide.

The preferred dialkyl dithiocarbamates are compounds having the general formula:

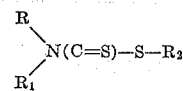

where R and $R_1$ represent alkyl groups containing from 1 to 6 carbon atoms, $R_2$ represents hydrogen, a metal of the alkali or alkaline earth groups, an ammonium radical or substituted ammonium radical. Some examples of these preferred dialkyl dithiocarbamates are dimethyl ammonium dimethyl dithiocarbamate, diethyl ammonium diethyl dithiocarbamate, and sodium dimethyl dithiocarbamate.

In carrying out the process of the present invention the water soluble inorganic compounds can be added to the latex at any stage of peptisation and are preferably added prior to stripping off residual monomer. They can be added to the latex in the form of an aqueous 2 to 5 percent solution. Emulsifying agents may be present to aid blending with the latex and to minimise the formation of coagulum. The reaction is preferably carried out under an inert atmosphere such as for example nitrogen. A suitable temperature range is between ambient temperature and 50° C. although higher temperatures may be used. A suitable pH range is between 8 to 12.3 and preferably 10.5 to 12.3.

When the preferred peptising agents are used it is preferred to treat the freshly prepared sulphur modified polychloroprene latex.

A suitable proportion by weight of tetra lower alkyl thiuram disulphide to dry rubber in the latex is in the range 0.1 to 5%. The preferred range is 1 to 5%.

A suitable proportion by weight of dialkyl dithiocarbamate to dry rubber is in the range 0.1 to 3.0%.

The process according to the present invention is illustrated in the following examples.

*Examples 1, 2 and 3*

A polychloroprene latex of pH 11.3 was prepared at 40° C. using well known emulsion polymerisation procedures in which a minor proportion of sulphur (0.5–0.6% by weight of monomer) was present in the alkaline emulsion, a wood resin was used as soap and potassium persulphate was used as a polymerisation initiator.

The polymerisation was terminated at the desired conversion level by addition of the peptising agents listed in the table. Immediately following this addition a dilute aqueous solution of sodium dithionite or sodium thiosulphate was added to give a concentration of 1.0% based of the weight of dry rubber.

The peptised latex was sampled after 1, 3, 5 and 8 hours, the rubber isolated and the Mooney viscosity determined.

The results presented in the table show by way of comparison a control peptising reaction where the sodium dithionite or thiosulphate has been omitted. These results demonstrate that the presence of a water soluble inorganic compound having a dithionite or thiosulphate radical accelerates the rate of peptisation of the latex.

TABLE

| Example | Agent added to peptise latex | Mooney viscosity (ML4'/100° C.) after peptisation for— | | | |
|---|---|---|---|---|---|
| | | 1 hour | 3 hours | 5 hours | 8 hours |
| Control | 2% tetraethyl thiuram disulphide | 142 | 94 | 90 | 84 |
| 1 | 2% tetraethyl thiuram disulphide/1% sodium dithionite | 43 | 35 | 31 | 30 |
| 2 | 2% tetraethyl thiuram disulphide/1% sodium thiosulphate | 86 | 69 | 65 | 54 |
| Control | 2% tetraethyl thiuram disulphide/0.5% diethylamine | 115 | 86 | 79 | 75 |
| 3 | 2% tetraethyl thiuram disulphide/0.5% diethylamine+1% sodium dithionite | 84 | 72 | 68 | 65 |

*Example 4*

A curable sulphur modified polychloroprene latex of pH 11.3 was prepared using the procedure described in Examples 1, 2 and 3.

A peptising mixture of tetraethyl thiuram disulphide and dimethyl ammonium dimethyl dithiocarbamate was then added to the latex to give a concentration based on the weight of dry curable sulphur modified polychloroprene of 2.4% tetraethyl thiuram disulphide and 0.12% dimethyl ammonium dimethyl dithiocarbamate. The peptising mixture contains 1 part tetraethyl thiuram disulphide 0.05 part dimethyl ammonium dimethyl dithiocarbamate, 2.5 parts toluene (or chloroprene), 0.125 part sodium lauryl sulphate and 3 parts of de-aerated water. The alkali metal salt was then added to the latex to give a concentration of 1% based on the weight of dry rubber.

The peptised latex was sampled after 1, 5 and 12 hours and the Mooney viscosity of the polymer estimated. The results presented in the table show by way of comparison a control peptising reaction in which the alkali metal salts have been omitted.

TABLE

| Agent added to peptise latex | Mooney viscosity (ML4'/100° C.) after peptisation for— | | |
|---|---|---|---|
| | 1 hour | 5 hours | 12 hours |
| Tetraethylthiuram disulphide/dimethylammonium dimethyldithiocarbamate (Control) | 128 | 90.5 | 77 |
| Tetraethylthiuram disulphide/dimethylammonium dimethyldithiocarbamate/1.0% sodium thiosulphate | 88 | 75 | 60 |
| Tetraethylthiuram disulphide/dimethylammonium dimethyldithiocarbamate/1.0% sodium dithionite | 45 | 33 | (*) |
| Tetraethylthiuram disulphide/dimethylammonium dimethyldithiocarbamate/1.0% sodium sulphide | 88.5 | 75.5 | 60 |

* No sample taken.

We claim:

1. A process for the peptisation of sulphur modified polychloroprene latex which comprises peptising a sulphur modified polychloroprene latex in the presence of an added water soluble inorganic compound selected from the group consisting of thiosulphate, sulphide, dithionite and mixtures thereof.

2. A process as claimed in claim 1 wherein the water soluble inorganic compound is the ammonium salt of thiosulphate, sulphide, dithionite or mixtures thereof.

3. A process as claimed in claim 1 wherein the water soluble inorganic compound is the alkali metal salt of thiosulphate, sulphide, dithionite or mixtures thereof.

4. A process as claimed in claim 1 wherein the proportion by weight of the water soluble inorganic compound to dry rubber in the latex is less than 1.0 percent.

5. A process as claimed in claim 1 wherein the latex is peptised with a tetra lower alkyl thiuram disulphide.

6. A process as claimed in claim 5 wherein the tetra alkyl thiuram disulphide is tetraethylthiuram disulphide.

7. A process as claimed in claim 1 wherein the latex is peptised with tetraethylthiuram disulphide and diethylamine.

8. A process as claimed in claim 1 wherein the latex is peptised with a tetra lower alkyl thiuram disulphide and a dialkyl dithiocarbamate.

9. A process as claimed in claim 8 wherein the tetra lower alkyl thiuram disulphide is tetraethylthiuram disulphide.

10. A process as claimed in claim 8 wherein the dialkyl dithiocarbamate is dimethyl ammonium dimethyl dithiocarbamate.

11. A process as claimed in claim 8, wherein the proportion by weight of tetra lower alkyl thiuram disulphide to dry rubber in the latex is in the range 1 to 5 percent.

12. A process as claimed in claim 8, wherein the proportion by weight of dialkyl dithiocarbamate to dry rubber in the latex is in the range 0.1 to 3.0 percent.

13. A process for the peptisation of sulphur modified polychloroprene latex which comprises peptising a sulphur modified polychloroprene latex with 1–5% by weight of a tetra lower alkyl thiuram disulphide based on the weight of dry rubber in the latex, 0.1–3.0% of a dialkyl dithiocarbamate based on the weight of the dry rubber in the latex in the presence of less than 1% of an added ammonium or alkali metal salt of thiosulphate, sulphide, dithionite or a mixture thereof based on the weight of dry rubber in the latex and recovering the peptised sulphur modified polychloroprene latex.

14. A process according to claim 13, wherein the ammonium or alkali metal salt is sodium.

References Cited by the Examiner

UNITED STATES PATENTS 2,514,362  7/1950  Banes et al. _____ 260—29.7
3,235,527  2/1966  Sparks _____ 260—29.7

FOREIGN PATENTS 529,838  11/1940  Great Britain.

MURRAY TILLMAN, *Primary Examiner.*

J. T. GOOLKASIAN, J. ZIEGLER, *Assistant Examiners.*